United States Patent
Kunieda et al.

(10) Patent No.: US 11,144,036 B2
(45) Date of Patent: Oct. 12, 2021

(54) SELECTION DEVICE, SELECTION METHOD, AND RECORDING MEDIUM

(71) Applicant: Mitsubishi Electric Corporation, Tokyo (JP)

(72) Inventors: Shigetoshi Kunieda, Tokyo (JP); Kei Terada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 142 days.

(21) Appl. No.: 16/468,684

(22) PCT Filed: Mar. 28, 2018

(86) PCT No.: PCT/JP2018/012662
§ 371 (c)(1),
(2) Date: Jun. 12, 2019

(87) PCT Pub. No.: WO2019/186748
PCT Pub. Date: Oct. 3, 2019

(65) Prior Publication Data
US 2021/0072728 A1    Mar. 11, 2021

(51) Int. Cl.
*G05B 19/4155* (2006.01)
*G06F 16/25* (2019.01)

(52) U.S. Cl.
CPC ....... *G05B 19/4155* (2013.01); *G06F 16/252* (2019.01); *G05B 2219/49269* (2013.01)

(58) Field of Classification Search
None
See application file for complete search history.

(56) References Cited

U.S. PATENT DOCUMENTS

| | | | |
|---|---|---|---|
| 2003/0033376 A1* | 2/2003 | Brownhill | G05B 19/0421 709/218 |
| 2010/0228697 A1 | 9/2010 | Komiya et al. | |

(Continued)

FOREIGN PATENT DOCUMENTS

| | | |
|---|---|---|
| CN | 101878589 A | 11/2010 |
| DE | 10 2006 059 829 A1 | 6/2008 |

(Continued)

OTHER PUBLICATIONS

International Search Report dated Jun. 19, 2018 for PCT/JP2018/012662 filed on Mar. 28, 2018, 2 pages in Japanese Language Only.

(Continued)

*Primary Examiner* — Charles E Anya
(74) *Attorney, Agent, or Firm* — Xsensus LLP

(57) ABSTRACT

A selection device includes: an information acquisition unit acquiring machine specification information, operation pattern information, and mechanical component specification information; a capacity calculation unit calculating capacity of a motor required for operating the machine based on the machine specification information, the operation pattern information, and the mechanical component specification information; a motor selection unit selecting a motor based on the capacity and information held in a motor database; an amplifier selection unit selecting an amplifier based on information on the selected motor and information held in an amplifier database; a mechanical component selection unit selecting the mechanical component based on the mechanical component specification information, the information about the motor selected by the motor selection unit, and information held in a mechanical component database; and a display unit displaying selection results obtained by the motor selection unit, the amplifier selection unit, and the mechanical component selection unit.

9 Claims, 11 Drawing Sheets

(56) References Cited

U.S. PATENT DOCUMENTS

| | | | | |
|---|---|---|---|---|
| 2011/0120838 A1* | 5/2011 | Kuhn | ............... | B65G 15/56 |
| | | | | 198/831 |
| 2013/0317633 A1* | 11/2013 | Matsumura | ............ | G05B 15/02 |
| | | | | 700/83 |
| 2015/0212518 A1* | 7/2015 | Umeda | ............... | G05B 19/4141 |
| | | | | 318/567 |
| 2016/0091890 A1* | 3/2016 | Fukatsu | ............... | G05B 19/414 |
| | | | | 700/159 |
| 2016/0231730 A1* | 8/2016 | Wakana | ............... | G05B 19/409 |
| 2017/0139391 A1* | 5/2017 | Yamamoto | ......... | G05B 19/0428 |
| 2017/0141581 A1* | 5/2017 | Yamamoto | ......... | G06Q 10/06 |
| 2017/0300036 A1* | 10/2017 | Maeda | ............... | G05B 19/0426 |

FOREIGN PATENT DOCUMENTS

| | | |
|---|---|---|
| JP | 2002-169854 A | 6/2002 |
| JP | 2003-99479 A | 4/2003 |
| JP | 2017-93209 A | 5/2017 |
| JP | 2017-93265 A | 5/2017 |
| WO | 03/027911 A1 | 4/2003 |
| WO | 2009/075152 A1 | 6/2009 |

OTHER PUBLICATIONS

Decision to Grant a Patent received for Japanese Patent Application No. 2018-545399, dated Dec. 11, 2018, 5 pages including English Translation.

Indian Office Action dated Jul. 22, 2020 from Indian Application No. 201927025026.

Chinese Office Action dated Jun. 23, 2020 Chinese application No. 201880011469.1.

German Office Action dated Feb. 6, 2020 in German Application No. 112018000484.8.

Korean Office Action dated Mar. 12, 2020 in Korean Application No. 10-2019-7023689.

Office Action dated Mar. 1, 2021 in Chinese Patent Application No. 201880011469.1, 14 pages.

Office Action dated Nov. 12, 2020 in Chinese Patent Application No. 201880011469.1, 14 pages.

* cited by examiner

FIG.12

| MOTOR | AMPLIFIER | MECHANICAL COMPONENT | | | |
|---|---|---|---|---|---|
| | | | REDUCTION DRIVE | | |
| HG-0001 | MR-*-F/G | GSK-AAA-1 | ... | ... | ... |
| HF-0001 | MR-*-F/G | GSK-AAA-1 | GSK-BBB-1 | ... | ... |
| KR-0001 | MR-*-F/G | GSK-AAA-1 | GSK-BBB-1 | TBK-P-X | TBK-R-X |
| ... | ... | ... | ... | ... | ... |

FIG.13

| MOTOR | AMPLIFIER | MECHANICAL COMPONENT | |
|---|---|---|---|
| | | REDUCTION DRIVE | |
| HG-0001 | MR-*-F/G | GSK-AAA-1 | |
| HF-0001 | MR-*-F/G | DISPLAY | 131 |
| KR-0001 | MR-*-F/G | DISPLAY | 131 |
| ... | ... | ... | |

LIST OF COMPATIBLE REDUCTION DRIVES 132

| REDUCTION DRIVE | REDUCTION RATIO | RATED OUTPUT TORQUE[N·m] | |
|---|---|---|---|
| GSK-AAA-1 | 3 | 2.1 | ... |
| GSK-BBB-1 | 3 | 2.5 | ... |
| TBK-P-X | 3 | 2.2 | ... |
| TBK-R-X | 2 | 2.4 | ... |
| ... | ... | ... | ... |

| MANUFAC-TURER | REDUCTION DRIVE | REDUCTION RATIO | RATED OUTPUT TORQUE[N·m] | ... |
|---|---|---|---|---|
| COMPANY A | GSK-AAA-1 | 3 | 2.1 | ... |
| COMPANY A | GSK-BBB-1 | 3 | 2.5 | ... |
| COMPANY B | TBK-P-X | 3 | 2.2 | ... |
| COMPANY B | TBK-R-X | 2 | 2.4 | ... |
| ... | ... | ... | ... | ... |

142

| MANUFAC-TURER | REDUCTION DRIVE | REDUCTION RATIO | RATED OUTPUT TORQUE[N·m] | ... |
|---|---|---|---|---|
| COMPANY A | GSK-AAA-1 | 3 | 2.1 | ... |
| COMPANY A | GSK-BBB-1 | 3 | 2.5 | ... |

SELECTION DEVICE, SELECTION METHOD, AND RECORDING MEDIUM

CROSS-REFERENCE TO RELATED APPLICATIONS

The present application is based on PCT filing PCT/JP2018/012662, filed Mar. 28, 2018, which is incorporated herein by reference.

FIELD

The present invention relates to a selection device for selecting a motor that drives a machine and a mechanical component for use in combination with the motor, to a selection method, and to a recording medium.

BACKGROUND

A technique for selecting a motor and a reduction drive that is a mechanical component for use in combination with the motor is described in Patent Literature 1.

In the technique described in Patent Literature 1, the optimum combination of motor and reduction drive is selected on the basis of specifications of a load that is driven by a motor. The selection method described in Patent Literature 1 includes temporarily selecting a motor and a reduction drive on the basis of the specifications of the load, verifying whether the load can be driven using the temporarily selected motor and reduction drive, and performing further verification on a different motor or reduction drive if the load cannot be driven. By repeating such processing, a combination of motor and reduction drive is selected.

CITATION LIST

Patent Literature

Patent Literature 1: Japanese Patent Application Laid-open No. 2003-099479

SUMMARY

Technical Problem

In order to drive a motor, an amplifier is required. However, in the technique described in Patent Literature 1, no amplifier is selected for use in combination with a motor. Therefore, after a motor and a reduction drive are selected, the user of the technique described in Patent Literature 1 needs to further perform the operation of selecting an amplifier on the basis of the selection results.

The present invention has been made in view of the above, and an object thereof is to obtain a selection device capable of selecting a combination of motor, mechanical component, and amplifier.

Solution to Problem

In order to solve the above-mentioned problem and to achieve the object, a selection device according to an aspect of the present invention includes: a motor database to hold information about a motor; an amplifier database to hold information about an amplifier; and a mechanical component database to hold information about a mechanical component. The selection device further includes: an information acquisition unit to acquire machine specification information indicating a specification of a machine, operation pattern information indicating an operation pattern of the machine, and mechanical component specification information indicating a specification of a mechanical component; a capacity calculation unit to calculate a capacity of a motor required for operating the machine on a basis of the machine specification information, the operation pattern information, and the mechanical component specification information; and a motor selection unit to select a motor on a basis of the capacity and the information held in the motor database. The selection device further includes: an amplifier selection unit to select an amplifier on a basis of information on the motor selected by the motor selection unit and the information held in the amplifier database; a mechanical component selection unit to select the mechanical component on a basis of the mechanical component specification information, the information about the motor selected by the motor selection unit, and the information held in the mechanical component database; and a display unit to display a selection result obtained by the motor selection unit, a selection result obtained by the amplifier selection unit, and a selection result obtained by the mechanical component selection unit.

Advantageous Effects of Invention

The selection device according to the present invention can achieve the effect of selecting a combination of motor, mechanical component, and amplifier.

BRIEF DESCRIPTION OF DRAWINGS

FIG. 12 is a diagram illustrating a first example of selection results displayed by the selection device according to the embodiment.

FIG. 13 is a diagram illustrating a second example of selection results displayed by the selection device according to the embodiment.

FIG. 14 is a diagram for explaining a mechanical component database provided in the selection device according to the embodiment.

DESCRIPTION OF EMBODIMENTS

Hereinafter, a selection device, a selection method, and a recording medium according to embodiments of the present invention will be described in detail with reference to the drawings. The present invention is not limited to the embodiments.

Embodiment

Figure 1:
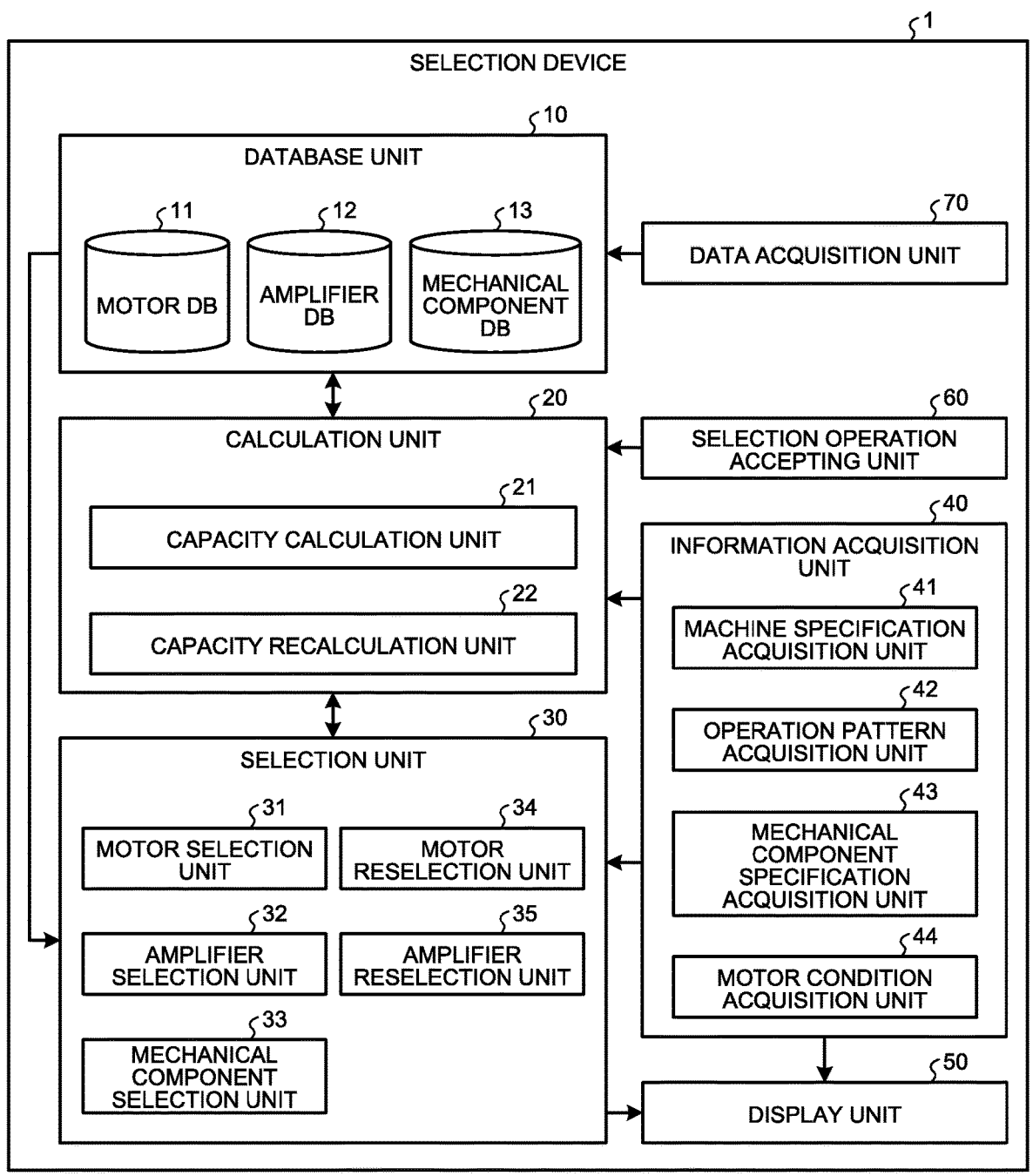
FIG. 1 is a diagram illustrating an exemplary configuration of a selection device according to an embodiment.

FIG. 1 is a diagram illustrating an exemplary configuration of a selection device according to an embodiment of the present invention. A selection device 1 according to the present embodiment includes a database unit 10, a calculation unit 20, a selection unit 30, an information acquisition unit 40, a display unit 50, a selection operation accepting unit 60, and a data acquisition unit 70.

The database unit 10 holds various data that the selection device 1 requires to select motors, amplifiers, and mechanical components for use in operating machines. Machines as used herein are driven by motors in a factory or the like to perform work such as transportation of products and rotation of a table. Examples of machines include conveyors, rotating tables, roll feeds, and the like. Mechanical components are configured to connect motors and machines to transmit power to the machines. Examples of mechanical components include couplings, reduction drives, V-belts, and the like.

The database unit 10 includes a motor database (motor DB) 11 that holds information about each motor to be selected; an amplifier database (amplifier DB) 12 that holds information about each amplifier to be selected; and a mechanical component database (mechanical component DB) 13 that holds information about each mechanical component to be selected. Hereinafter, information about motors will be referred to as motor-related information, information about amplifiers will be referred to as amplifier-related information, and information about mechanical components will be referred to as mechanical-component-related information. Motor-related information is, for example, motor specification information indicating motor specifications. Amplifier-related information is, for example, amplifier specification information indicating amplifier specifications. Mechanical-component-related information is, for example, mechanical component specification information indicating mechanical component specifications.

The calculation unit 20 calculates the capacity of a motor required for operating the machine on the basis of the data held in the database unit 10 and information (described later) acquired from outside by the information acquisition unit 40. The calculation unit 20 includes a capacity calculation unit 21 that calculates the capacity when the information acquisition unit 40 acquires information (described later) from outside, and a capacity recalculation unit 22 that recalculates the capacity when the user performs the operation of selecting a mechanical component.

The selection unit 30 selects a motor, an amplifier, and a mechanical component. The selection unit 30 includes a motor selection unit 31 that selects a motor; an amplifier selection unit 32 that selects an amplifier; a mechanical component selection unit 33 that selects a mechanical component; a motor reselection unit 34 that reselects a motor when the capacity is recalculated in the capacity recalculation unit 22; and an amplifier reselection unit 35 that reselects an amplifier when the capacity is recalculated in the capacity recalculation unit 22.

The information acquisition unit 40 accepts, for example, an information entry from the user, and acquires various types of information corresponding to the entry. It should be noted that the information acquisition unit 40 may acquire various types of information as data files from another device connected via a network. The information acquisition unit 40 includes a machine specification acquisition unit 41 that acquires machine specification information indicating specifications of the machine to be used; an operation pattern acquisition unit 42 that acquires operation pattern information indicating the operation pattern of the machine to be used; a mechanical component specification acquisition unit 43 that acquires mechanical component specification information indicating specifications of the mechanical component to be used; and a motor condition acquisition unit 44 that acquires motor condition information indicating conditions of the motor to be used. Note that the selection device 1 keeps the above-described information acquired by the machine specification acquisition unit 41, the operation pattern acquisition unit 42, the mechanical component specification acquisition unit 43, and the motor condition acquisition unit 44 of the information acquisition unit 40 until the selection device 1 finishes selecting a motor, an amplifier, and a mechanical component.

The display unit 50 displays, for example, selection results obtained by the selection unit 30 and screens through which the information acquisition unit 40 accepts information entries from the user.

The selection operation accepting unit 60 accepts the user's operation of selecting a mechanical component.

The data acquisition unit 70 acquires data to be registered in the motor database 11, the amplifier database 12, and the mechanical component database 13 of the database unit 10.

In the configuration described in the present embodiment, the database unit 10 exists inside the selection device 1. Alternatively, the database unit 10 may exist outside the selection device 1. Specifically, the database unit 10 may exist in an external device, e.g. a server device, different from the selection device 1, and the selection device 1 may be connected to the external device via a communication line. The communication line may be a wired line or a wireless line.

Figure 2:
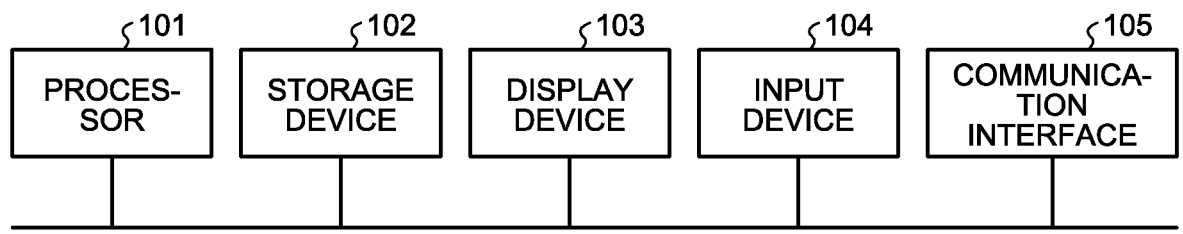
FIG. 2 is a diagram illustrating an example of hardware that implements the selection device according to the embodiment.

FIG. 2 is a diagram illustrating an example of hardware that implements the selection device according to the present embodiment. The selection device 1 can be implemented by a processor 101, a storage device 102, a display device 103, an input device 104, and a communication interface 105 illustrated in FIG. 2.

The storage device 102 is a random access memory (RAM), a read only memory (ROM), an erasable programmable read only memory (EPROM), an electrically erasable programmable read only memory (EEPROM, registered trademark), a hard disk drive, or the like. The display device 103 is a liquid crystal panel or the like. The input device 104 is a mouse, a keyboard, or the like. The display device 103 and the input device 104 may be a touch panel in which an input device and a display device are integrated.

The calculation unit 20, the selection unit 30, the information acquisition unit 40, the selection operation accepting unit 60, and the data acquisition unit 70 of the selection device 1 are implemented by the processor 101 executing a program for operating as each of these units. A program for operating as the calculation unit 20, the selection unit 30, the information acquisition unit 40, the selection operation accepting unit 60, and the data acquisition unit 70 is stored in advance in the storage device 102. By reading and executing the program from the storage device 102, the processor 101 operates as the calculation unit 20, the selection unit 30, the information acquisition unit 40, the selection operation accepting unit 60, and the data acquisition unit 70. When operating as the information acquisition unit 40, the selection operation accepting unit 60, and the data acquisition unit 70, the processor 101 accepts the user's operation by utilizing the input device 104. The processor 101 operates as the data acquisition unit 70, and utilizes the communication interface 105 when acquiring data from another device over a network.

The database unit 10 of the selection device 1 is implemented by the storage device 102, and the display unit 50 is implemented by the display device 103.

Hereinafter, the operation of the selection device 1 for selecting a motor, an amplifier, and a mechanical component will be described with reference to FIGS. 3 to 15.

Figure 3:
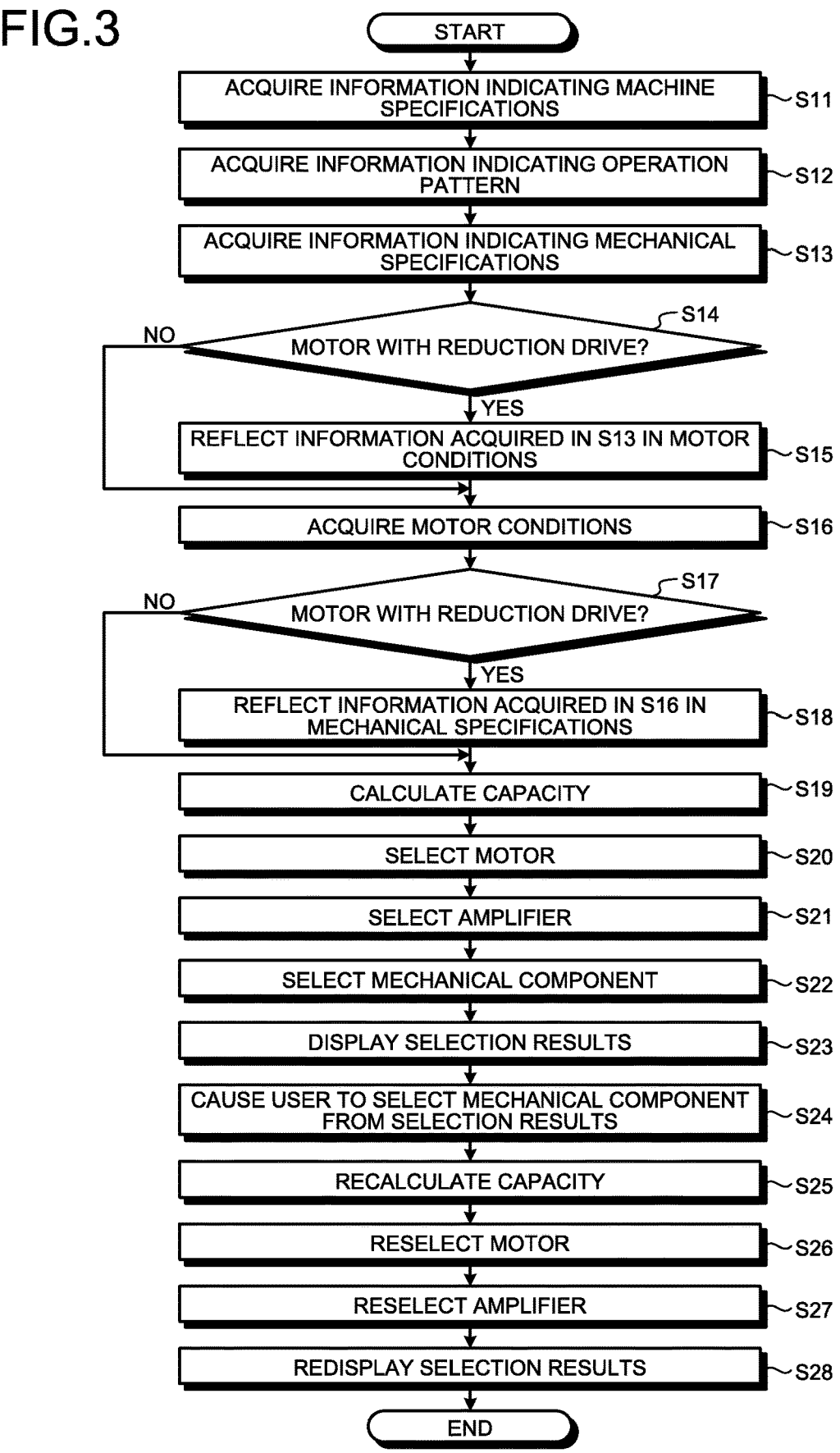
FIG. 3 is a flowchart illustrating an operation example of the selection device according to the embodiment.

FIG. 3 is a flowchart illustrating an operation example of the selection device according to the present embodiment. The selection device 1 selects a motor, an amplifier, and a mechanical component by performing the operation according to the flowchart illustrated in FIG. 3.

Figure 4:
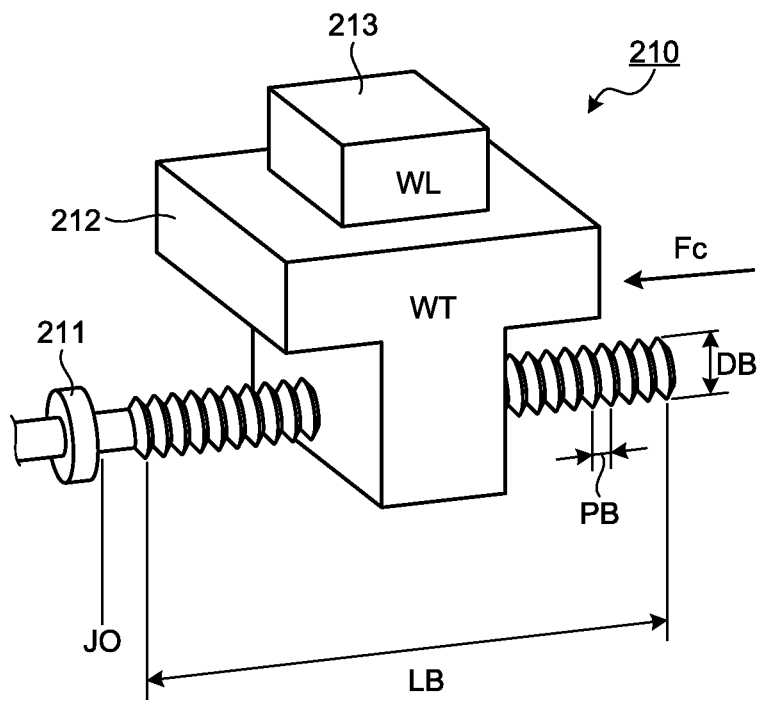
FIG. 4 is a view illustrating an example of a ball screw mechanism.

In order to select a motor, an amplifier, and a mechanical component, the selection device 1 first accepts a machine specification entry from the user to acquire information indicating machine specifications, i.e., specifications of the machine (step S11). At this time, the selection device 1 displays, on the display unit 50, a screen through which the user enters information indicating machine specifications. In the selection device 1, the machine specification acquisition unit 41 of the information acquisition unit 40 executes step S11. In the case of a ball screw mechanism 210 as illustrated in FIG. 4, for example, the machine specifications include the mass of a ball screw 211, the pitch PB of the ball screw 211, the mass WT of a table 212 that is moved by the rotation of the ball screw 211, the mass WL of a load 213 on the table 212, the external force Fc applied to the table 212, and the like.

Figure 5:
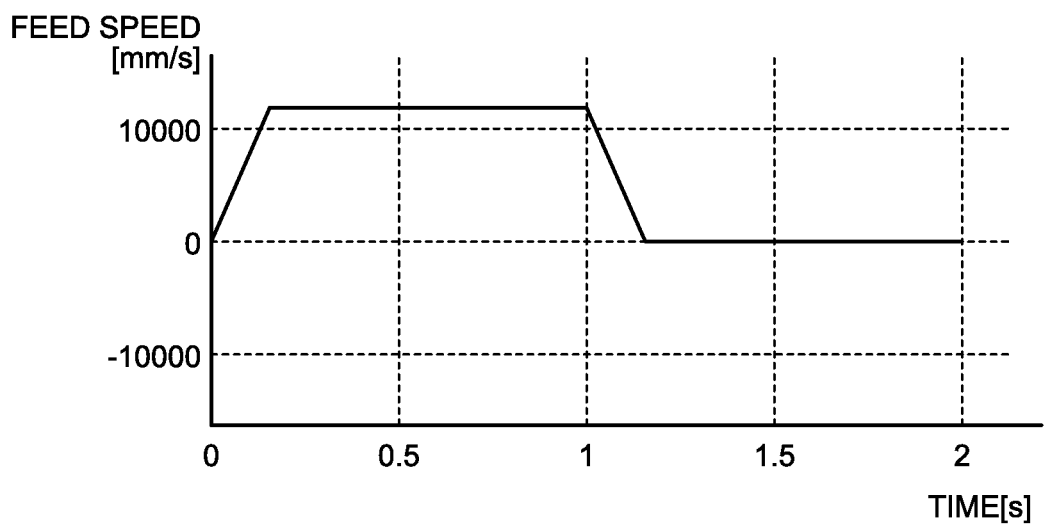
FIG. 5 is a diagram illustrating an example of an operation pattern.

Next, the selection device 1 accepts an operation pattern entry from the user to acquire information indicating the operation pattern (step S12). At this time, the selection device 1 displays, on the display unit 50, a screen through which the user enters information indicating an operation pattern. In the selection device 1, the operation pattern acquisition unit 42 of the information acquisition unit 40 executes step S12. As used herein, an operation pattern indicates an operation state for driving a machine such as the ball screw mechanism 210 described above. In a case where the machine is the ball screw mechanism 210, the operation pattern is represented by the feed speed of the table 212 constituting the ball screw mechanism 210 with respect to the elapsed time as illustrated in FIG. 5.

Figure 6:
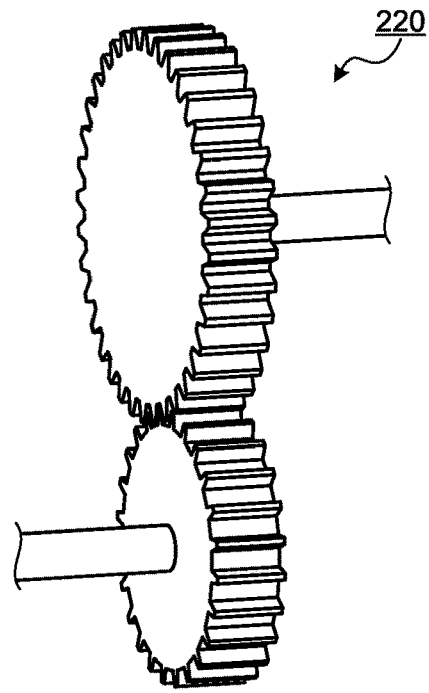
FIG. 6 is a view illustrating an example of a reduction drive.
Figure 7:
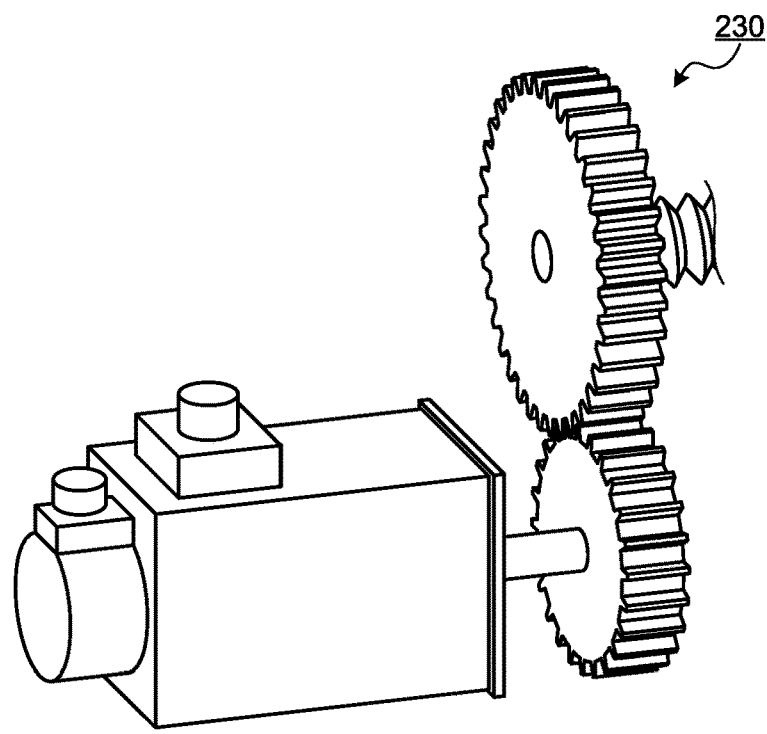
FIG. 7 is a diagram illustrating an example of a motor with a reduction drive.

Next, the selection device 1 accepts a mechanical component specification entry from the user to acquire information indicating mechanical specifications, i.e., specifications of the mechanical component (step S13). At this time, the selection device 1 displays, on the display unit 50, a screen through which the user enters information indicating mechanical specifications. In the selection device 1, the mechanical component specification acquisition unit 43 of the information acquisition unit 40 executes step S13. In a case where the mechanical component is a reduction drive 220 as illustrated in FIG. 6, for example, specifications of the mechanical component include the reduction ratio, the moment of inertia, and the like. The mechanical component specification acquisition unit 43 can cause the user to select, as a mechanical component, a motor with a reduction drive 230 in which a reduction drive and a motor are integrated as illustrated in FIG. 7. When the user selects the motor with a reduction drive 230 as a mechanical component, the mechanical component specification acquisition unit 43 acquires information indicating specifications of the reduction drive and also acquires information indicating the result of motor selection.

Figure 8:
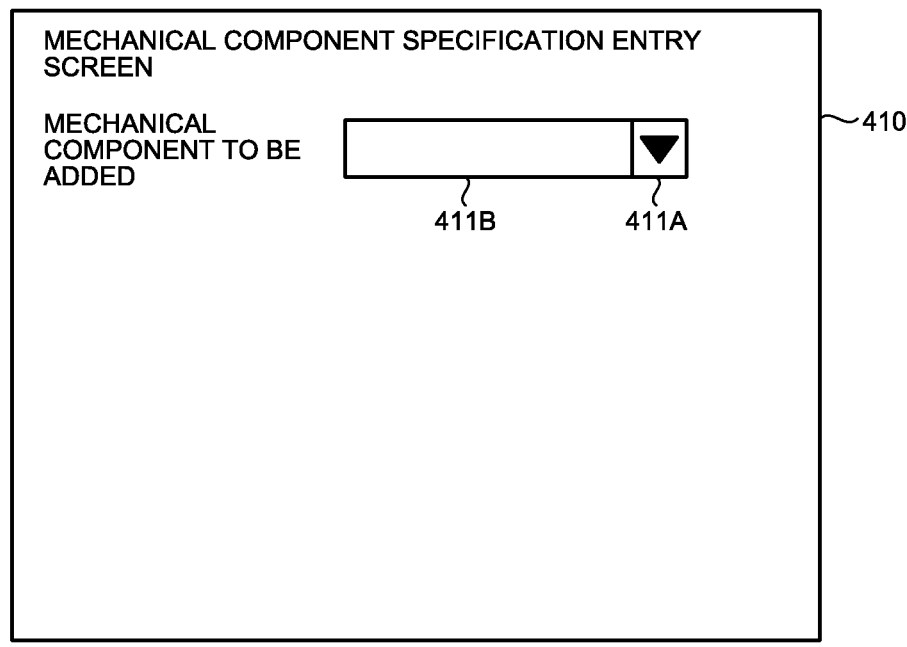
FIG. 8 is a diagram illustrating a first example of a mechanical component specification entry screen displayed by the selection device according to the embodiment.
Figure 9:
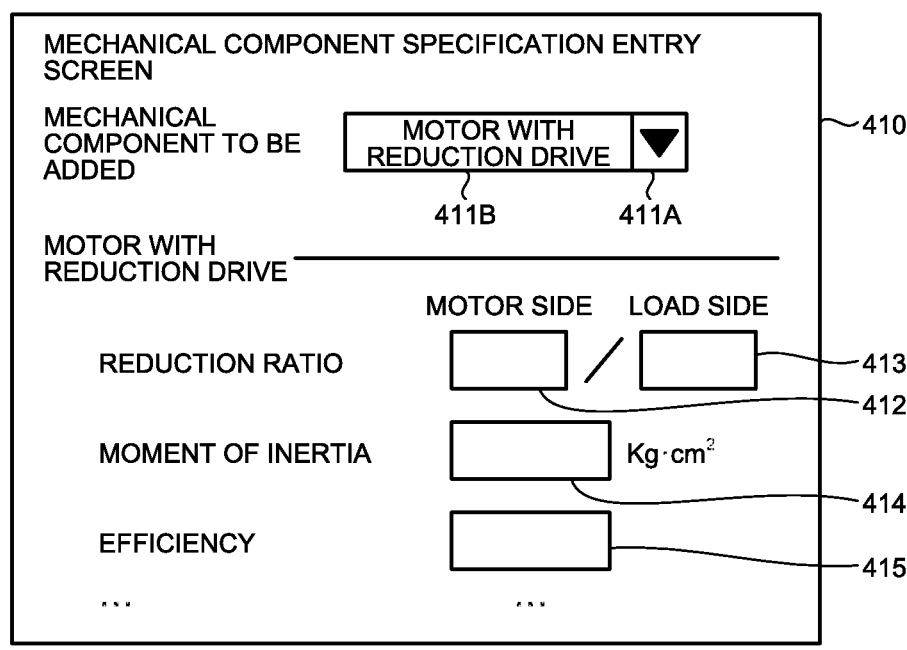
FIG. 9 is a diagram illustrating a second example of a mechanical component specification entry screen displayed by the selection device according to the embodiment.
Figure 10:
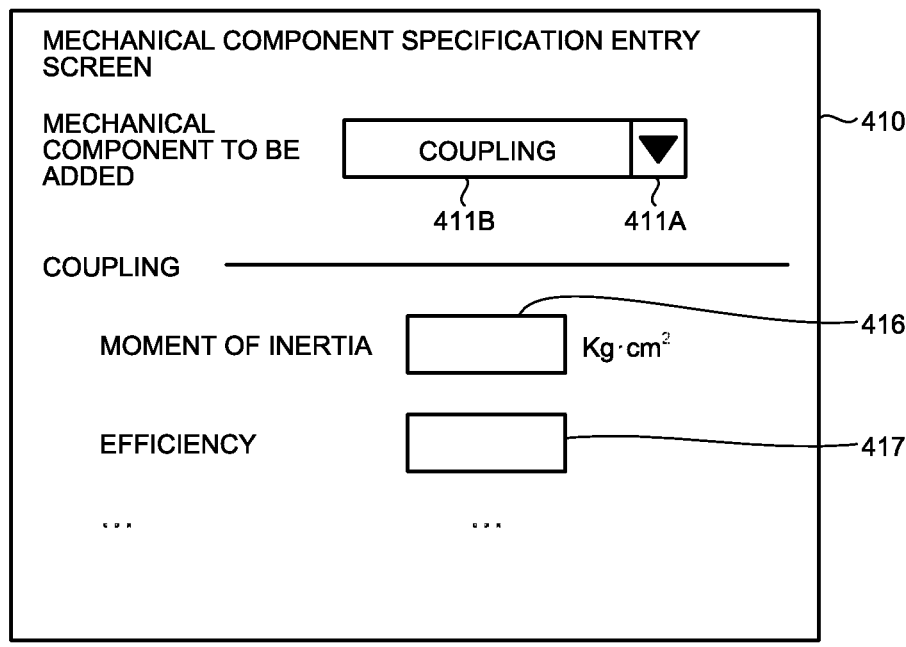
FIG. 10 is a diagram illustrating a third example of a mechanical component specification entry screen displayed by the selection device according to the embodiment.

FIGS. 8, 9, and 10 are diagrams illustrating examples of screens displayed by the mechanical component specification acquisition unit 43 on the display unit 50 in step S13.

FIG. 8 illustrates an example of an initial screen displayed by the mechanical component specification acquisition unit 43 on the display unit 50 in step S13. Specifically, the mechanical component specification entry screen 410 illustrated in FIG. 8 is displayed on the display unit 50 while waiting for the user to select a mechanical component. The mechanical component specification entry screen 410 illustrated in FIG. 8 includes a selection button 411A for allowing the user to select a mechanical component to be added, and a display field 411B for displaying the selected mechanical component. For example, in response to detecting that the user clicks the selection button 411A with a mouse, the mechanical component specification acquisition unit 43 displays a pull-down menu to allow the user to select a desired mechanical component from the menu.

FIG. 9 illustrates an example of a screen displayed by the mechanical component specification acquisition unit 43 on the display unit 50 when a motor with a reduction drive is selected as a mechanical component. As illustrated in FIG. 9, the mechanical component specification entry screen 410 displayed when a motor with a reduction drive is selected as a mechanical component includes reduction ratio entry fields 412 and 413, an inertia moment entry field 414, an efficiency entry field 415, and the like as well as the selection button 411A and the display field 411B. In addition, on the mechanical component specification entry screen 410 illustrated in FIG. 9, "motor with reduction drive" indicating the selection result is displayed in the display field 411B.

FIG. 10 illustrates an example of a screen displayed by the mechanical component specification acquisition unit 43 on the display unit 50 when a coupling is selected as a mechanical component. As illustrated in FIG. 10, the mechanical component specification entry screen 410 displayed when a coupling is selected as a mechanical component includes a coupling inertia moment entry field 416, a coupling efficiency entry field 417, and the like as well as the selection button 411A and the display field 411B. In addition, on the mechanical component specification entry screen 410 illustrated in FIG. 10, "coupling" indicating the selection result is displayed in the display field 411B.

The mechanical component specification entry screen 410 illustrated in FIGS. 8, 9, and 10 is a first information entry screen.

After the user enters necessary mechanical specifications in step S13, in response to accepting the operation of finishing the mechanical specification entry, the selection device 1 determines whether a motor with a reduction drive has been selected (step S14). If a motor with a reduction drive is selected in step S13 (step S14: Yes), the selection device 1 reflects the information acquired in step S13 in motor conditions (step S15). In this step S15, the selection device 1 records that a motor with a reduction drive has been selected and that specification information has been acquired. At the start of step S16 for acquiring motor conditions (described later), the selection device 1 operates on the premise that a motor with a reduction drive has been selected and that specification information has been acquired. If a motor with a reduction drive is not selected in step S13 (step S14: No), the selection device 1 proceeds to step S16.

In step S16, the selection device 1 accepts a motor condition entry from the user to acquire information indicating motor conditions. At this time, the selection device 1 displays, on the display unit 50, a screen through which the user enters information indicating motor conditions. As described above, in a case where a motor with a reduction drive is selected in step S13, the acquired specification information, more specifically, the information entered in the reduction ratio entry fields 412 and 413, the inertia moment entry field 414, the efficiency entry field 415, and the like illustrated in FIG. 9, is displayed on the initial screen. The initial screen is the screen displayed by the display unit 50 at the start of step S16. In a case where a motor with a reduction drive is selected in step S13, the motor condition acquisition unit 44 of the information acquisition unit 40 displays in step S16, for example, a motor condition entry screen 440 illustrated in FIG. 11 as the initial screen on the display unit 50. The motor condition entry screen 440 includes a brake presence/absence selection field 441, a reduction drive presence/absence selection field 442, and the like as fields for motor condition entry. The motor condition entry screen 440 also includes reduction ratio entry fields 443 and 444, an inertia moment entry field 445, and the like as fields for reduction drive specification entry. In the example of the motor condition entry screen 440 illustrated in FIG. 11, since a motor with a reduction drive has been selected in step S13 and information on specifications of the reduction drive, i.e., information on the reduction ratio, information on the moment of inertia, and the like, has been acquired, these items of information are displayed on the motor condition entry screen 440. The motor condition entry screen 440 illustrated in FIG. 11 is a second information entry screen.

Figure 11:
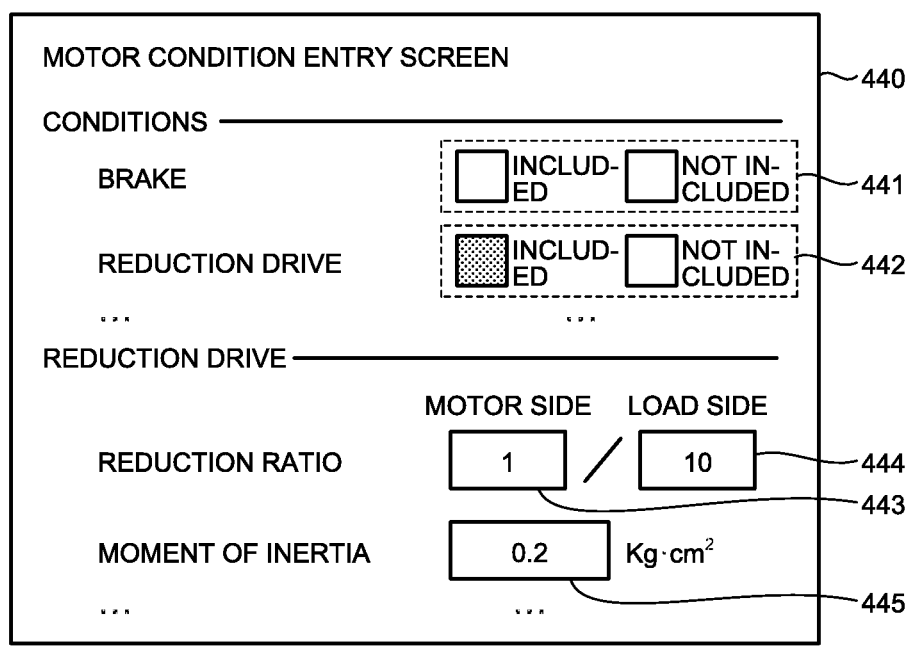
FIG. 11 is a diagram illustrating an example of a motor condition entry screen displayed by the selection device according to the embodiment.

Note that in the state where a motor with a reduction drive has been selected in step S13 and the motor condition entry screen 440 as illustrated in FIG. 11 has been displayed on the display unit 50 as the initial screen in step S16, the user may perform the operation of correcting information such as the reduction ratio reflected in the initial screen. In this case, the motor condition acquisition unit 44 accepts this operation. Similarly, in the state where the motor condition entry screen 440 as illustrated in FIG. 11 has been displayed on the display unit 50 as the initial screen in step S16, the user may perform the operation of selecting "not included" in the reduction drive presence/absence selection field 442 (operation of changing motor conditions). In this case, the motor condition acquisition unit 44 accepts this operation.

If a motor with a reduction drive is not selected in step S13, the motor condition acquisition unit 44 displays the motor condition entry screen 440 on the display unit 50 with the reduction ratio entry fields 443 and 444, the inertia moment entry field 445, and the like illustrated in FIG. 11 left blank.

After the user enters necessary motor conditions in step S16, in response to accepting the operation of finishing the motor condition entry, the selection device 1 determines whether a motor with a reduction drive has been selected (step S17). If a motor with a reduction drive is not selected in step S13 above but selected in step S16, the selection device 1 determines that a motor with a reduction drive has been selected (step S17: Yes), and proceeds to step S18. In step S18, the selection device 1 reflects the information acquired in step S16 in mechanical specifications. Specifically, the selection device 1 updates the information indicating mechanical specifications such that the information indicates that a motor with a reduction drive has been selected. The information indicating mechanical specifications may be updated by the motor condition acquisition unit 44 or by the mechanical component specification acquisition unit 43. It should be noted that the process of step S16 in which the selection device 1 acquires motor conditions is not essential. In other words, the selection device 1 does not have to execute the process of step S16. In this case, the selection device 1 executes step S19 without executing steps S14 to S18 after executing step S13 described above.

If a motor with a reduction drive is not selected in step S16 (step S17: No) or after executing step S18, the selection device 1 calculates the capacity required for operating the machine (step S19). In step S19, the capacity calculation unit 21 calculates the capacity. In this step S19, for example, on the basis of the mass of the table constituting the machine and the mass of the load indicated by the information acquired in step S11 and on the basis of the moment of inertia of the mechanical component indicated by the information acquired in step S13, the capacity calculation unit 21 calculates the torque required for operating the machine according to the operation pattern indicated by the information acquired in step S12.

The selection device 1 then selects a motor (step S20). In step S20, on the basis of the motor conditions acquired by the motor condition acquisition unit 44 in step S16 and the capacity calculated by the capacity calculation unit 21 in step S19, the motor selection unit 31 selects a motor from among the motors indicated by the data held in the motor database 11. For example, first, the motor selection unit 31 selects motors that can be installed at the ambient temperatures indicated by the information acquired in step S16. Next, the motor selection unit 31 selects a motor capable of outputting the torque calculated in step S19 from among the selected motors. The torque for selecting a motor may be either the continuous effective torque or the maximum torque, or may be both of them. If a plurality of motors satisfy the conditions, that is, both the ambient temperature condition and the torque condition, the plurality of motors are selected. In the above-described procedure without steps S14 to S18, the motor selection unit 31 selects a motor capable of outputting the calculated torque on the basis of only the torque calculated in step S19.

Next, the selection device 1 selects an amplifier (step S21). In step S21, the amplifier selection unit 32 selects an amplifier compatible with each motor selected in step S20 from among the amplifiers indicated by the data held in the amplifier database 12. The amplifier selection unit 32 selects an amplifier compatible with the output of the motor selected in step S20, that is, an amplifier that can drive the selected motor. For example, the amplifier selection unit 32 selects an amplifier having a larger output than the selected motor. In a case where a plurality of motors are selected in step S20, the amplifier selection unit 32 selects an amplifier for each of the plurality of motors. In a case where a plurality of amplifiers are compatible with each motor selected in step S20, the amplifier selection unit 32 selects a plurality of amplifiers for one motor. In addition, after selecting amplifiers compatible with the output of the motor in step S21, the selection device 1 may acquire conditions for narrowing down the amplifiers from the user to narrow down the selection results. Conditions for narrowing down the amplifiers are acquired by the information acquisition unit 40, for example. Conditions for narrowing down the amplifiers may include, for example, whether the amplifiers are network-compatible. A network-compatible amplifier is an amplifier that can be used when a control device for controlling a machine is connected to the machine via a network, and has the function of transmitting/receiving a control signal to/from the control device over the network.

Next, the selection device 1 selects a mechanical component (step S22). In step S22, the mechanical component selection unit 33 selects a mechanical component compatible with each motor selected in step S20 from among the mechanical components indicated by the data held in the mechanical component database 13. Specifically, the mechanical component selection unit 33 selects a mechanical component on the basis of the information indicating mechanical specifications acquired in step S13 and information about the motor selected in step S20. For example, first, the mechanical component selection unit 33 selects, as mechanical components, reduction drives having the reduction ratio indicated by the information acquired in step S13, and selects a reduction drive corresponding to the torque that each motor selected in step S20 can output.

The selection device 1 then displays the selection results (step S23). In step S23, the display unit 50 displays the motor selected by the motor selection unit 31 in step S20, the amplifier selected by the amplifier selection unit 32 in step S21, and the mechanical component selected by the mechanical component selection unit 33 in step S22. The display unit 50 may display the selection results in any type of format. For example, if there are a plurality of selection results of at least one of motors, amplifiers, and mechanical components, the display unit 50 may display the plurality of selection results in a list format. Display examples for this case are illustrated in FIGS. 12 and 13. In the examples illustrated in FIGS. 12 and 13, reduction drives are selected as mechanical components. FIG. 12 is a display example in which a plurality of reduction drives are selected for each of the combination of motor HF-001 and amplifier MR-*-F/G and the combination of motor KR-001 and amplifier MR-*-F/G. In the case of the example illustrated in FIG. 13, for a plurality of reduction drives selected, the selection device 1 first displays a display button 131 for displaying a list of the selected reduction drives on the display unit 50. After that, once the display button 131 is selected by a click operation or the like, the selection device 1 displays a list 132 of the reduction drives corresponding to the selected display button on the display unit 50.

Consequently, the selection device 1 can notify the user of the selection results of motors, amplifiers, and mechanical components that conform to the machine specifications, operation pattern, mechanical specifications, and motor conditions indicated by the information acquired from the user in steps S11, S12, S13, and S16.

Next, the selection device 1 waits for the user to select one mechanical component from the selection results displayed on the display unit 50. Specifically, the selection device 1 causes the user to select one mechanical component from the selection results (step S24). Even when only one selection result is displayed on the display unit 50 in step S23, the selection device 1 waits for the user to select a mechanical component.

In response to the user selecting a mechanical component, the selection device 1 recalculates the capacity (step S25).

Note that the selection operation accepting unit 60 accepts the user's selection and notifies the calculation unit 20 of the selection result.

In step S25, the capacity recalculation unit 22 recalculates the capacity. The capacity recalculation unit 22 first acquires, from the mechanical component database 13, information indicating specifications of the mechanical component selected by the user in step S24. Next, using the acquired information, the capacity recalculation unit 22 calculates the capacity by following the procedure used by the capacity calculation unit 21 when calculating the capacity in step S19 above. More specifically, the capacity recalculation unit 22 recalculates the capacity on the basis of the information acquired from the mechanical component database 13, the information acquired by the machine specification acquisition unit 41 in step S11 above, and the information acquired by the operation pattern acquisition unit 42 in step S12 above. For example, if the mechanical component is a reduction drive, the mechanical component specification acquisition unit 43 acquires in step S13 information indicating 0.3 kg·cm$^2$ as the moment of inertia of the reduction drive, and the moment of inertia of the reduction drive selected by the user in step S24 is 0.2 kg·cm$^2$, the calculation unit 20 changes the moment of inertia of the reduction drive from 0.3 kg·cm$^2$ to 0.2 kg·cm$^2$ to recalculate the torque.

In this way, the selection device 1 first calculates the capacity using approximate values acquired from the user as mechanical component specifications, and then recalculates the capacity using information on the mechanical component that is actually used. Consequently, the torque or the like that meets the actual use conditions can be accurately calculated. The improved accuracy of calculation can achieve accurate reselection of a motor, an amplifier, and a mechanical component using the recalculated capacity.

The selection device 1 then reselects a motor (step S26). In step S26, on the basis of the motor conditions acquired by the motor condition acquisition unit 44 in step S16 and the capacity recalculated by the capacity recalculation unit 22 in step S25, the motor reselection unit 34 reselects a motor from among the motors indicated by the data held in the motor database 11. The method of reselecting a motor by the motor reselection unit 34 is similar to the method of selecting a motor by the motor selection unit 31 in step S20 above.

Next, the selection device 1 reselects an amplifier (step S27). In step S27, the amplifier reselection unit 35 reselects an amplifier compatible with each motor reselected in step S26 from among the amplifiers indicated by the data held in the amplifier database 12. The method of reselecting an amplifier by the amplifier reselection unit 35 is similar to the method of selecting an amplifier by the amplifier selection unit 32 in step S21 above.

The selection device 1 then redisplays the selection results (step S28). In step S28, the display unit 50 displays the motor reselected by the motor reselection unit 34 in step S26, the amplifier reselected by the amplifier reselection unit 35 in step S27, and the mechanical component selected by the user in step S24. At this time, the display unit 50 may display not only the mechanical component (e.g. the reduction drive) selected by the user in step S24 but also a plurality of mechanical components compatible with the motor and amplifier reselected in steps S26 and S27. Consequently, it is possible to realize the function of allowing the user to reselect a different mechanical component and further reselecting a motor and an amplifier compatible with the reselected mechanical component. That is, the user can easily select motors and amplifiers by using various types of mechanical components such as reduction drives.

Here, in the mechanical component database 13, information on specifications of components such as reduction drives and couplings is stored as information on mechanical components. Information on reduction drives as mechanical components includes, for example, the reduction ratio, moment of inertia, allowable torque, and rated output torque of the reduction drives. Information on couplings as mechanical components includes, for example, the moment of inertia and allowable torque of the couplings. As illustrated in FIG. 14, for example, information 141 on mechanical components stored in the mechanical component database 13 may include information about manufacturers that manufacture mechanical components. In such a case, the selection device 1 can extract information 142 on each manufacturer's mechanical components from the information 141 on mechanical components stored in the mechanical component database 13 for display on the display unit 50. Therefore, the user of the selection device 1 or the administrator of the selection device 1 can perform operations on the mechanical component database 13, specifically, add, delete, and edit information, for each manufacturer, which facilitates maintenance of the mechanical component database 13.

Figure 15:
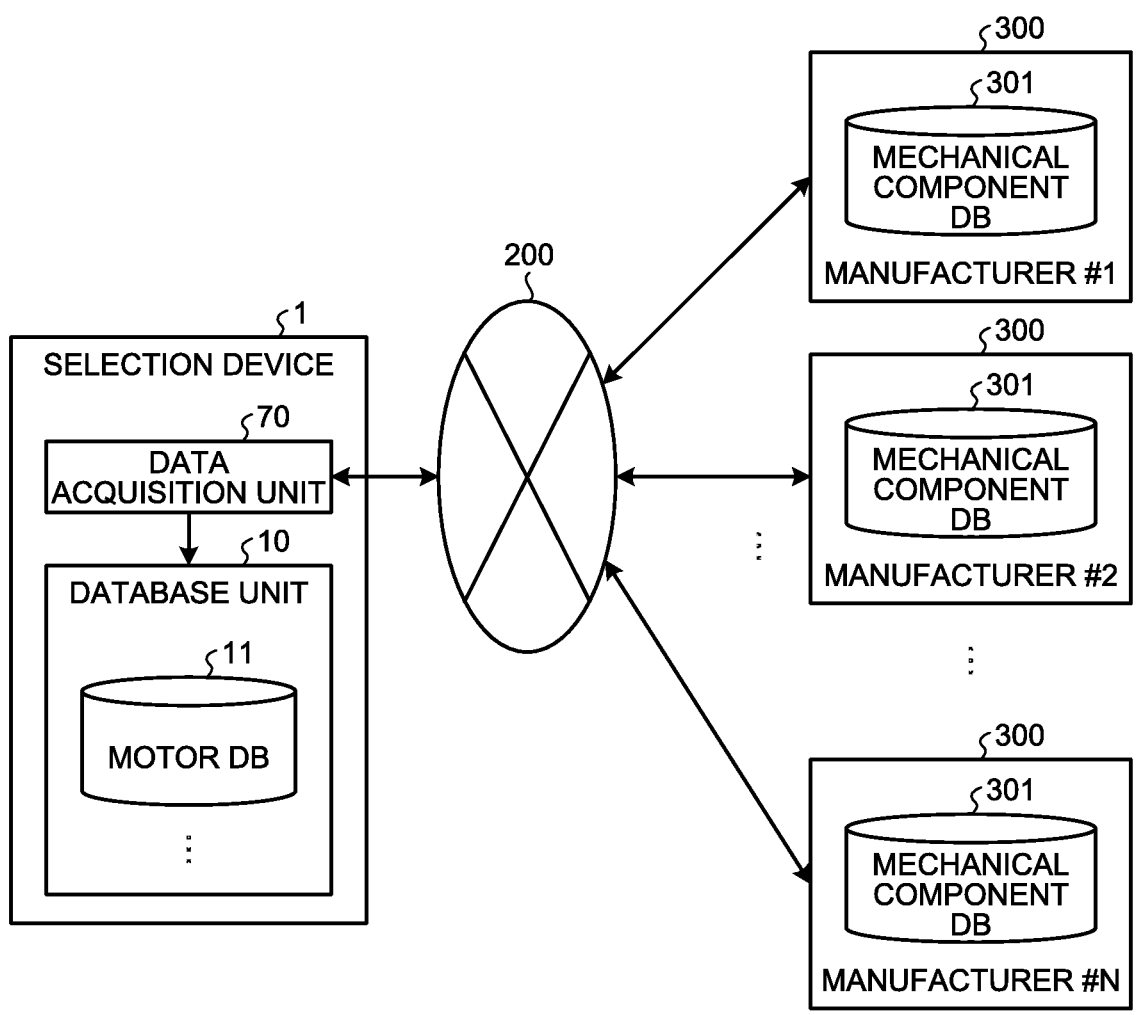
FIG. 15 is a diagram illustrating an exemplary configuration in which mechanical component databases exist outside the selection device according to the embodiment.

Although the selection device 1 includes the mechanical component database 13 in the database unit 10, the mechanical component database 13 may be provided outside the selection device 1. In this case, the external mechanical component database may be distributed among a plurality of devices. For example, as illustrated in FIG. 15, a database (DB) 301 of each manufacturer's mechanical components may be constructed in a server device 300 installed in each mechanical component manufacturer, and each database 301 may be connected to the selection device 1 via a network 200. In FIG. 15, components of the selection device 1 other than the database unit 10 and the data acquisition unit 70 are not illustrated.

The above descriptions of exemplary items of mechanical component information held in the mechanical component database 13 and an exemplary case in which the mechanical component database 13 exists outside the selection device 1 also apply to the motor database 11 and the amplifier database 12.

As described above, the selection device 1 according to the present embodiment holds motor-related information, amplifier-related information, and mechanical-component-related information. The selection device 1 acquires, from the user, information indicating specifications of the machine to be used, information indicating the operation pattern of the machine, information indicating specifications of the mechanical component to be used, and information indicating conditions of the motor to be used, and selects a motor, an amplifier, and a mechanical component on the basis of the acquired information. In addition, the selection device 1 notifies the user of the selection results. When the user selects one of the mechanical components included in the selection results, the selection device 1 reselects a motor, an amplifier, and a mechanical component using information about the mechanical component selected by the user. Consequently, the selection device 1 can select a combination of motor, mechanical component, and amplifier that satisfies the conditions specified by the user. In addition, since the selection device 1 performs reselection using information about the mechanical component selected by the user from the selection results, the selection accuracy can be improved.

The configurations described in the above-mentioned embodiments indicate merely examples of an aspect of the present invention. The configurations can be combined with another well-known technique, and part of the configurations can be omitted or changed in a range not departing from the gist of the present invention.

REFERENCE SIGNS LIST

1 selection device; 10 database unit; 11 motor database; 12 amplifier database; 13 mechanical component database; 20 calculation unit; 21 capacity calculation unit; 22 capacity recalculation unit; 30 selection unit; motor selection unit; 32 amplifier selection unit; 33 mechanical component selection unit; 34 motor reselection unit; 35 amplifier reselection unit; 40 information acquisition unit; 41 machine specification acquisition unit; 42 operation pattern acquisition unit; 43 mechanical component specification acquisition unit; 44 motor condition acquisition unit; 50 display unit; 60 selection operation accepting unit; 70 data acquisition unit; 200 network; 300 server device; 301 database.

The invention claimed is:

1. A selection device comprising:
   a motor database to store information about a motor;
   an amplifier database to store information about an amplifier;
   a mechanical component database to store information about a mechanical component;
   information acquisition circuitry to acquire machine specification information indicating a specification of a machine, operation pattern information indicating an operation pattern of the machine, and mechanical component specification information indicating a specification of a mechanical component;
   capacity calculation circuitry to calculate a capacity of a motor required for operating the machine on a basis of the machine specification information, the operation pattern information, and the mechanical component specification information;
   motor selection circuitry to select a motor on a basis of the capacity and the information held in the motor database;
   amplifier selection circuitry to select an amplifier on a basis of information on the motor selected by the motor selection circuitry and the information held in the amplifier database;
   mechanical component selection circuitry to select the mechanical component on a basis of the mechanical component specification information, the information about the motor selected by the motor selection circuitry, and the information held in the mechanical component database; and
   a display device to display at least one selection result obtained by the motor selection circuitry, at least one selection result obtained by the amplifier selection circuitry, and at least one selection result obtained by the mechanical component selection circuitry, wherein
   if there are a plurality of selection results in the at least one selection results for at least one of the motor, the amplifier, and the mechanical component, the display device displays, in a list format, combinations of the motor, the amplifier, and the mechanical component selected to allow a user to select one of the plurality of selection results, the selection device further comprising:
   selection operation accepting circuitry to accept, if the selection result of the mechanical component includes a plurality of selection results of mechanical components an operation of selecting one mechanical component included in the plurality of selection results of the mechanical components;

capacity recalculation circuitry to recalculate a capacity of a motor required for operating the machine on a basis of the machine specification information, the operation pattern information, and information indicating a specification of the mechanical component corresponding to the operation accepted by the selection operation accepting circuitry;

motor reselection circuitry to reselect a motor on a basis of the capacity recalculated by the capacity recalculation circuitry and the information held in the motor database; and amplifier reselection circuitry to reselect an amplifier on a basis of information on the motor reselected by the motor reselection circuitry and the information held in the amplifier database, wherein the display device displays the mechanical component corresponding to the operation accepted by the selection operation accepting circuitry, the motor reselected by the motor reselection circuitry, and the amplifier reselected by the amplifier reselection circuitry.

2. The selection device according to claim 1, wherein
the information acquisition circuitry further acquires motor condition information indicating a condition of a motor,
the motor selection circuitry selects a motor on a basis of the capacity calculated by the capacity calculation circuitry, the information held in the motor database, and the motor condition information, and
the motor reselection circuitry reselects a motor on a basis of the capacity recalculated by the capacity recalculation circuitry, the information held in the motor database, and the motor condition information.

3. The selection device according to claim 2, wherein
the mechanical component specification information includes information on a type of mechanical component,
the motor condition information includes information on a specification of a motor, and
the information acquisition circuitry is configured to:
wait for input of the mechanical component specification information in a state where a first information entry screen is displayed on the display device when acquiring the mechanical component specification information;
wait for input of the motor condition information in a state where a second information entry screen is displayed on the display device when acquiring the motor condition information; and
if information acquired by displaying the first information entry screen on the display device indicates a specification of a motor with a reduction drive, reflect the acquired information in the second information entry screen that is displayed on the display device after acquiring the first information.

4. The selection device according to claim 1, wherein
the information about the mechanical component held in the mechanical component database includes information on a mechanical component manufacturer, and
the mechanical component selection circuitry selects a mechanical component corresponding to a manufacturer specified by a user on a basis of the mechanical component specification information, the information about the motor selected by the motor selection circuitry, and the information held in the mechanical component database.

5. The selection device according to claim 4, wherein
a process of adding the mechanical component specification information to the mechanical component database, a process of deleting the mechanical component specification information from the mechanical component database, and a process of editing the mechanical component specification information held in the mechanical component database are performed for each mechanical component manufacturer.

6. The selection device according to claim 4, wherein
the mechanical component database includes a plurality of databases connected via a network, and the plurality of databases store the mechanical component specification information of different manufacturers.

7. The selection device according to claim 4, wherein
the mechanical component is configured to transmit mechanical power from the motor to the machine.

8. A selection method for a selection device to select a motor, an amplifier, and a mechanical component, the selection device including a motor database to store information about a motor, an amplifier database to store information about an amplifier, and a mechanical component database to store information about a mechanical component, the selection method comprising:
an information acquisition of acquiring machine specification information indicating a specification of a machine, operation pattern information indicating an operation pattern of the machine, and mechanical component specification information indicating a specification of a mechanical component;
a capacity calculation of calculating a capacity of a motor required for operating the machine on a basis of the machine specification information, the operation pattern information, and the mechanical component specification information;
a motor selection of selecting a motor on a basis of the capacity and the information held in the motor database;
an amplifier selection of selecting an amplifier on a basis of information on the motor selected in the motor selection and the information held in the amplifier database;
a mechanical component selection of selecting the mechanical component on a basis of the mechanical component specification information, the information about the motor selected in the motor selection, and the information held in the mechanical component database; and
displaying at least one selection result obtained in the motor selection, at least one selection result obtained in the amplifier selection, and at least one selection result obtained in the mechanical component selection, wherein
if there are a plurality of selection results in the at least one selection results for at least one of the motor, the amplifier, and the mechanical component, the display device displays, in a list format, combinations of the motor, the amplifier, and the mechanical component selected to allow a user to select one of the plurality of selection results, the method further comprising:
a selection operation accepting of accepting if the selection result of the mechanical component includes a plurality of selection results of mechanical components, an operation of selecting one mechanical component included in the plurality of selection results of the mechanical components;

a capacity recalculation of recalculating a capacity of a motor required for operating the machine on a basis of the machine specification information, the operation pattern information, and information indicating a specification of the mechanical component corresponding to the operation accepted in the selection operation accepting;

a motor reselection of reselecting a motor on a basis of the capacity recalculated in the capacity recalculation and the information held in the motor database;

an amplifier reselection of reselecting an amplifier on a basis of information on the motor reselected in the motor reselection and the information held in the amplifier database; and a reselection result displaying of displaying the mechanical component corresponding to the operation accepted in the selection operation accepting, the motor reselected in the motor reselection, and the amplifier reselected in the amplifier reselection.

9. A tangible non-transitory computer-readable recording medium that stores therein a selection program for causing a computer to execute:

an information acquisition of acquiring machine specification information indicating a specification of a machine, operation pattern information indicating an operation pattern of the machine, and mechanical component specification information indicating a specification of a mechanical component;

a capacity calculation of calculating a capacity of a motor required for operating the machine on a basis of the machine specification information, the operation pattern information, and the mechanical component specification information;

a motor selection of selecting a motor on a basis of the capacity and information about a motor held in a motor database;

an amplifier selection of selecting an amplifier on a basis of information on the motor selected in the motor selection and information about an amplifier held in an amplifier database;

a mechanical component selection of selecting the mechanical component on a basis of the mechanical component specification information, the information about the motor selected in the motor selection, and information about a mechanical component held in a mechanical component database; and displaying at least one selection result obtained in the motor selection, at least one selection result obtained in the amplifier selection, and at least one selection result obtained in the mechanical component selection, wherein if there are a plurality of selection results for the at least one selection results for at least one of the motor, the amplifier, and the mechanical component, the display device displays, in a list format, combinations of the motor, the amplifier, and the mechanical component selected to allow a user to select one of the plurality of selection results, the selection program further causing the computer to execute:

a selection operation accepting of accepting, if the selection result of the mechanical component includes a plurality of selection results of mechanical components, an operation of selecting one mechanical component included in the plurality of selection results of the mechanical components;

a capacity recalculation of recalculating a capacity of a motor required for operating the machine on a basis of the machine specification information, the operation pattern information, and information indicating a specification of the mechanical component corresponding to the operation accepted in the selection operation accepting;

a motor reselection of reelecting a motor on a basis of the capacity recalculated in the capacity recalculation and the information held in the motor database;

an amplifier reselection of reselecting an amplifier on a basis of information on the motor reselected in the motor reselection and the information held in the amplifier database; and a reselection result displaying of displaying the mechanical component corresponding to the operation accepted in the selection operation accepting, the motor reselected in the motor reselection, and the amplifier reselected in the amplifier reselection.

* * * * *